United States Patent

[11] 3,630,298

[72] Inventors: Robert F. Orr;
William C. Susor, both of Toledo, Ohio
[21] Appl. No.: 63,734
[22] Filed: Aug. 14, 1970
[45] Patented: Dec. 28, 1971
[73] Assignee: The Reliance Electric and Engineering Company
Toledo, Ohio
Original application Dec. 16, 1968, Ser. No. 783,831. Divided and this application Aug. 14, 1970, Ser. No. 63,734

[54] ELECTRICAL WEIGH SCALE WITH DIGITAL CUTOFF SYSTEM
3 Claims, 3 Drawing Figs.

[52] U.S. Cl. .................................................. 177/46, 177/25, 177/164, 177/DIG. 3
[51] Int. Cl. ........................................... G01g 23/37, G01g 19/417, G01g 23/365
[50] Field of Search ............................ 177/3–5, 25, 164, 210, 211, DIG. 1, DIG. 3, 45–48; 235/92 (50), 58 PS, 61 PS

[56] References Cited
UNITED STATES PATENTS

| | | | |
|---|---|---|---|
| 2,928,033 | 3/1960 | Abbott | 235/92 (50) |
| 3,035,648 | 5/1962 | Williams | 177/DIG. 3 |
| 3,464,508 | 9/1969 | Engle et al. | 177/164 |
| 3,490,017 | 1/1970 | Kolell et al. | 235/92 (50) |

Primary Examiner—Robert S. Ward, Jr.
Attorney—Thomas H. Grafton

ABSTRACT: A digital cutoff system comprising a weighing scale, means for producing digital signals in accordance with load upon the scale, means for selecting a desired weight, and coincidence means for detecting coincidence between the digital signals and the desired weight and for detecting in at least one number place an additional digital signal greater than the desired digital signal in the number place. The additional digital signal forces the coincidence means to produce a cutoff signal even though the digital signals are greater than the desired weight.

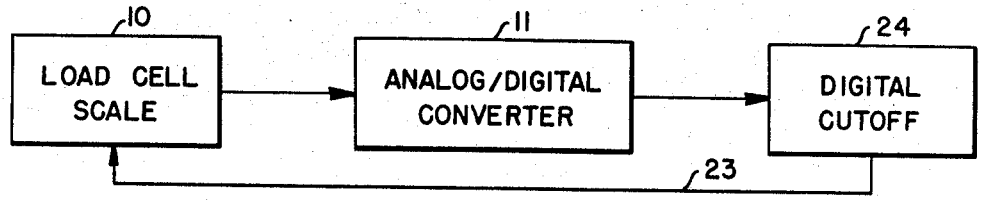
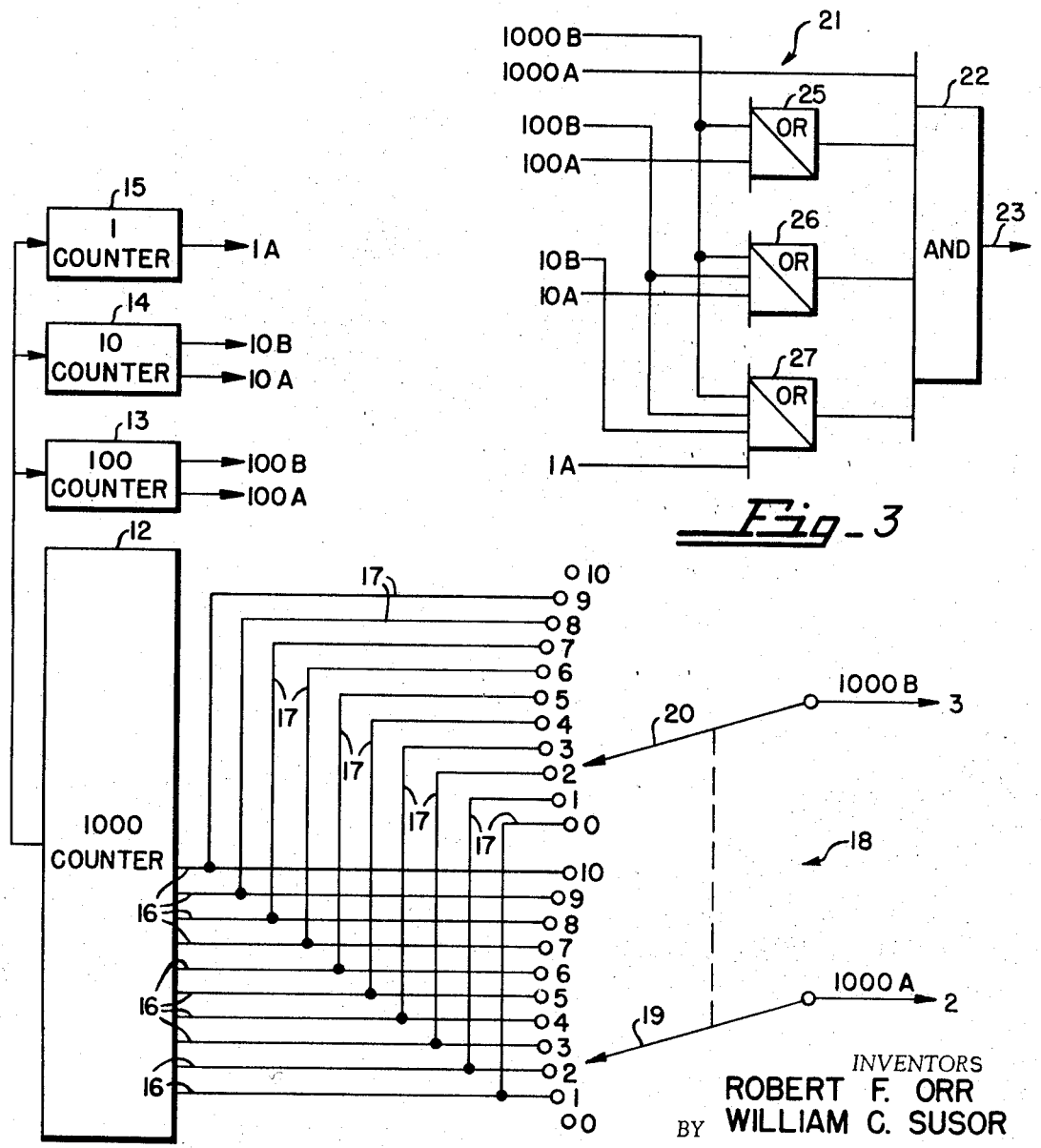

ELECTRICAL WEIGH SCALE WITH DIGITAL CUTOFF SYSTEM

This application is a division of application Ser. No. 783,831, filed Dec. 16, 1968, in the names of Robert F. Orr and William C. Susor.

BACKGROUND OF THE INVENTION

The invention relates to systems for detecting coincidence between the output of a condition responsive digital signal source and a selector for selecting the condition which may be, for example, weight on a batching scale or parts on a counting scale.

SUMMARY OF THE INVENTION

Specifically, the invention envisions a digital cutoff system having simple means for producing a cutoff signal at coincidence between a changing condition, such as the weight of material being fed onto a weighing scale, and a desired condition, such as the desired weight, and also when the weight of material for some reason or other runs past coincidence.

One solution to the problem would be to have a series of coincidence circuits detecting when coincidence exists and also when the actual weight is greater than that desired. Such circuits are expensive.

The inventive solution in one embodiment resides in having a ganged double switch select each digit except the least significant in a desired batch weight. One contact in each gang receives a selected weight responsive digital output and the other contact in such gang receives the next higher digital output. Hence, if there is overweight on the scale, it is sensed by the ganged switch.

Ordinarily a coincidence circuit receives from four switches the desired digital outputs and produces a cutoff signal when its four inputs are present. However, the coincidence circuit has provision for receiving the desired digital outputs and the next higher digital outputs each of which next higher outputs overrides all desired outputs of lesser significance to produce the cutoff signal even though a large lump of material has fallen upon the scale just prior to cutoff so that the system is not at coincidence.

The objects of this invention are to improve digital cutoff systems, to improve techniques in weighing materials in a batching process, and to provide a digital batching system of superior simplicity.

BRIEF DESCRIPTION OF THE DRAWING

FIG. 1 is a block diagram of an electrical or electronic batch weighing scale system;

FIG. 2 is a wiring diagram showing part of the analog-to-digital converter and part of the digital cutoff shown in FIG. 1; and FIG. 3 is a block diagram showing the rest of the digital cutoff.

DESCRIPTION OF THE PREFERRED EMBODIMENT

A load cell scale 10 and an analog-to-digital converter 11 are disclosed in U.S. application Ser. No. 557,708 filed June 15, 1966 in the name of Robert D. Kohler. The weighing scale 10 establishes an analog signal (voltage) corresponding to the weight of an object being weighed and the converter 11 produces counterbalancing voltage steps. Counters 38-41 shown in the pending application accumulate the weight readout count; their counterparts are shown as counters 12-15 in FIG. 2. One of the four identical counters is shown in detail in FIG. 6 of the pending application and has 10 sustained output leads. The 1,000 place counter 12 has 10 sustained output leads 16 (digital signals in accordance with load upon the scale) ending in terminals identified as "1-10," respectively. The counter 12 is a ring counter but differs from the conventional ring counter in that as the count proceeds the stages do not turn off but rather remain on to put sustained outputs on the leads 16 until at the 10th count all 10 stages are on. The 1,000 place counter 12 also has 10 additional output leads 17 connecting the output leads 16 to additional terminals identified as "0-9." The "1" terminal shown in the lower part of FIG. 2 is connected to the upper "0" terminal, the lower "2" terminal is connected to the upper "1" terminal, etc. The lower set of terminals includes a blank "0" terminal and the upper set includes a blank "10" terminal. One count in the counter 12 produces an output signal at lower terminal "1" and at its connected terminal "0," two counts in the counter 12 produces such output signals plus an output signal at lower terminal "2" and at its connected terminal "1," etc.

A ganged switch 18 is used to select the 1,000 place in a desired weight. As shown in FIG. 2, the selected digit in the 1,000 place of the desired weight is a "2." The lower switch deck 19 receives a two digital signal (indicated as 1,000A-2) while the upper switch deck 20 receives a three digital signal (indicated as 1,000B-3). Similar ganged switches not shown are used to select the 10 and 100 places in the desired weight; the digital signals in the 10 place being indicated as 10A and 10B and the digital signals in the 100 place being indicated as 100A and 100B, it being understood that the counters 13 and 14 each have double sets of sustained output leads and terminals which are similar to those shown connected to counter 12. Counter 15 (1 place) has only a single set of sustained output leads and terminals which are like leads 16 and their terminals and a single-decked switch for selecting the 1 place in a desired weight as indicated by output 1A in connection with counter 15.

The digital cutoff is useful in a weighing system which automatically batches differing weights of several ingredients into a weigh single hopper. The switches are moved to select a desired weight having four number places, the switches connecting the outputs 1,000A and B, 100A and B, 10A and B, and 1A to a coincidence circuit 21 shown in FIG. 3. As the first material flows onto the scale, sustained output digital signals appear at the terminals until the coincidence circuit detects coincidence between the digital signals and the desired weight, whereupon the circuit 21 which includes an AND-gate 22 produces a cutoff signal 23 which controls a relay that in turn controls a valve cutting off the flow of the material onto the scale. Relays in a weighing scale batching system for dribble cutoff, final cutoff, and over and under tolerance detection are disclosed in U.S. Pat. No. 3,106,974 issued Oct. 15, 1963 in the name of Roger B. Williams, Jr. For the sake of simplicity, FIGS. 1-3 disclose a digital cutoff 24 for one material; digital cutoff 24 includes the switch 18, the three switches not shown for counters 13-15, and the coincidence circuit 21.

The coincidence circuit 21 also includes an OR-gate 25 which receives the 1,000B and 100A signals, an OR-gate 26 which receives the 1,000B, 100B, and 10A signals, and an OR-gate 27 which receives the 1,000B, 100B, 10B and 1A signals. The three outputs of the OR gates partially enable the AND-gate 22 which is completely enabled by the 1,000A signal.

Ordinarily in operation, the desired weight of one batch ingredient is selected by positioning the four switches (one shown as switch 18) to their respective terminals. As the batch ingredient flows onto the scale 10, digital signals are produced. For example, if the number chosen is 2,875 pounds, two counts in the 1,000 counter 12, eight counts in the 100 counter 13, seven counts in the 10 counter 14, and five counts in the 1 counter 15 produce the desired digital signals at the respective terminals which are transferred by the switches as a 1,000A signal directly to the AND-gate 22, a 100A signal to the OR-gate 25, a 10A signal to the OR-gate 26, and a 1A signal to the OR-gate 27. The three outputs of the OR gates and the direct 1,000A signal enable the AND-gate 22 which then produces its cutoff signal 23 to cut off the flow of material to the scale 10.

If, however, a large lump of the material falls upon the scale just prior to cutoff, the weight may run quickly beyond the coincidence point. In the above example, the desired weight is 2,875 pounds. If three counts are entered in the 1,000 counter 12, sustained signals appear on terminals "1," "2" and "3" at lower switch deck 19 and on terminals "0," "1" and "2" at upper switch deck 20. The lower switch deck 19 applies the 1,000A-2 signal directly to the AND-gate 22 and the upper switch deck 20 applies the 1,000B-3 signal to the three OR-gates 25-27 as overriding signals so that the AND-gate 22 produces its cutoff signal 23 even though too much load is upon the scale. The usual coincidence circuit can sense coincidence only and not coincidence or condition beyond coincidence as does the circuit 21.

Similarly in overweight circumstances, a 100B signal is applied to OR-gates 26 and 27 as an overriding signal and a signal 10B is applied to OR-gate 27 as an overriding signal. This arrangement is not necessary in the least significant place (1A signals).

Each of the counters 12-15 is a condition responsive digital signal source for each place in a number to be selected, the number being in accordance with a desired condition, e.g., weight. Each of the sources produces, as load is placed upon the scale 10, a desired signal corresponding to a desired digit and each of the sources, except the least significant, also produces an additional digital signal corresponding to the next higher digit whenever the weight of the load upon the scale is higher by one digit in the respective place. The circuit 21 is responsive to the desired digital signals in the absence of any additional digital signal and produces a normal output signal for each place in the number (signal 1,000A and outputs of the three OR gates when signals 100A, 10A and 1A are applied to the OR gates) and also is responsive to any said additional digital signal to produce an overriding output signal (outputs of the three OR gates when signals 1,000B, 100B and 10B are applied to the OR gates for all places of significance less than the place corresponding to the additional digital signal. The overriding output signals take the place of the normal output signals resulting in one output signal for each place in the number. The AND-gate 22 receives the four output signals and produces a cutoff signal 23 at coincidence or beyond coincidence.

Essentially the digital cutoff system is for obtaining a desired condition, e.g., weight, and includes means for comparing a condition responsive digital signal to a digital reference, such means including the terminals of leads 16, means (switch deck 19) for generating a first signal A when the digital signal equals the digital reference, and means (switch deck 20) for generating a second signal B when the digital signal is greater than the digital reference, no signals A or B being generated when the digital signal is less than the digital reference. The coincidence circuit 21 is means for controlling the desired condition in accordance with signals A and B.

It is to be understood that the above description is illustrative of this invention and that various modifications thereof can be utilized without departing from its spirit and scope.

Having described the invention, we claim:

1. A digital cutoff system comprising, in combination, a weighing scale, means for producing digital signals in accordance with load upon the scale, means for selecting a desired weight, and coincidence means for detecting coincidence between the digital signals and the desired weight and for detecting in at least one number place an additional digital signal greater than the desired digital signal in said number place.

2. A digital cutoff system according to claim 1 wherein the means for selecting a desired weight includes double switch means for transmitting both digital signals in said number place to the coincidence means.

3. A digital cutoff system according to claim 1 wherein the coincidence means includes means for producing an overriding output signal for all places of significance less than said number place.

* * * * *